United States Patent
Switzer et al.

(10) Patent No.: US 7,389,434 B2
(45) Date of Patent: Jun. 17, 2008

(54) KEEP AWAKE HEURISTIC

(75) Inventors: David Switzer, Redmond, WA (US); Geralyn M. Miller, Redmond, WA (US); Issa Y. Khoury, Redmond, WA (US); Matthew H. Holle, Redmond, WA (US); Michael S. Bernstein, Redmond, WA (US); Ross N. Luengen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 11/215,379

(22) Filed: Aug. 30, 2005

(65) Prior Publication Data

US 2007/0050654 A1 Mar. 1, 2007

(51) Int. Cl.
*G06F 1/00* (2006.01)
*G06F 1/26* (2006.01)
*G06F 1/32* (2006.01)

(52) U.S. Cl. .............. 713/320; 713/300; 713/310; 713/323

(58) Field of Classification Search ............... 713/320
See application file for complete search history.

(56) References Cited

U.S. PATENT DOCUMENTS 6,516,421 B1 * 2/2003 Peters .................. 713/502

* cited by examiner

*Primary Examiner*—Rehana Perveen
*Assistant Examiner*—Michael J Brown
(74) *Attorney, Agent, or Firm*—Wolf, Greenfield & Sacks, P.C.

(57) ABSTRACT

A method of controlling power management is provided. In an embodiment, the user provides feedback that the inactivity period before a display blanks is too short. In response to the user feedback, a behavior tracking mode is entered and the inactivity period is adjusted to a period that is more suitable to the user's needs. In an embodiment, the adjustment may be done through incrementing a counter and changing the inactivity period based on the value of the counter.

19 Claims, 8 Drawing Sheets

KEEP AWAKE HEURISTIC

DESCRIPTION OF RELATED ART

Computing power has greatly increased since the inception of the silicon based computer chip. As the size of transistors has decreased, the cost per transistors has been approximately halved every 18 months, leading to significantly more powerful computers at similar costs. Thus, the processors used in computers have become more powerful while costing less. This rapid technological change has enabled numerous advancements in science such as improved medicine and, in general, has enabled significant improvements in productivity. Computers are now ubiquitous and have become a standard part of work, education and entertainment.

Unfortunately, the increases in power and productively have come at a cost, increased energy consumption. Modem desktop computers regularly consume more than 100 Watts and often consume 200 or more Watts when under a heavy processing load. Laptops and hand-held computers also suffer from this increase in energy consumption, although to a lesser extent. Even with the reduced power consumption of portable computers, however, batteries manufactures have struggled to produce batteries capable of storing enough energy to meet consumer expectations.

One side effect of the additional energy being consumed is that power requirements have increased in a financially observable manner. While the effect is less noticeable for a single individual, larger corporations running thousands of computers have noticed the additional energy consumption in the form of higher electricity bills. To combat the increased energy consumption of the modern computer, more aggressive power management techniques have begun to be implemented. For example, on desktop computers the monitor can be set to shut off or blanked in response to a period of inactivity by the user.

While aggressive power management techniques can provide substantial cost savings, especially for larger corporations, the power management techniques have been less than popular among certain users. For example, it is difficult to set an aggressive time for blanking a display without interfering with user's work experience. Accordingly, users will often adjust the time before the display blanks to something much more than optimum so as to avoid interruptions to their use of the computer.

BRIEF SUMMARY

A power behavior module monitors activity of the user and adjusts the power consumption of hardware in response to user feedback. In an example, a display is blanked after a user fails to provide input for an activity period. If the user provides feedback to indicate the display should be turned on within a response period, the display is turned on and the power behavior module begins to track user behavior. If the user again does not provide input for the inactivity period, the display is again blanked. If the user again provides timely feedback to activate the display, the inactivity period is increased. Thus, the user feedback allows the power behavior module to automatically adapt to user preferences regarding the blanking of the display.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

The description that follows has been divided into portions so as to assist the reader, the portions including: Basic PC Devices and Heuristic Methods. It is noted that various connections are disclosed between various components and modules. Unless otherwise noted, these connections may be wired, wireless, direct, indirect, local or remote and this disclosure is not intended to be limiting in this regard.

Basic PC Devices

Figure 1:
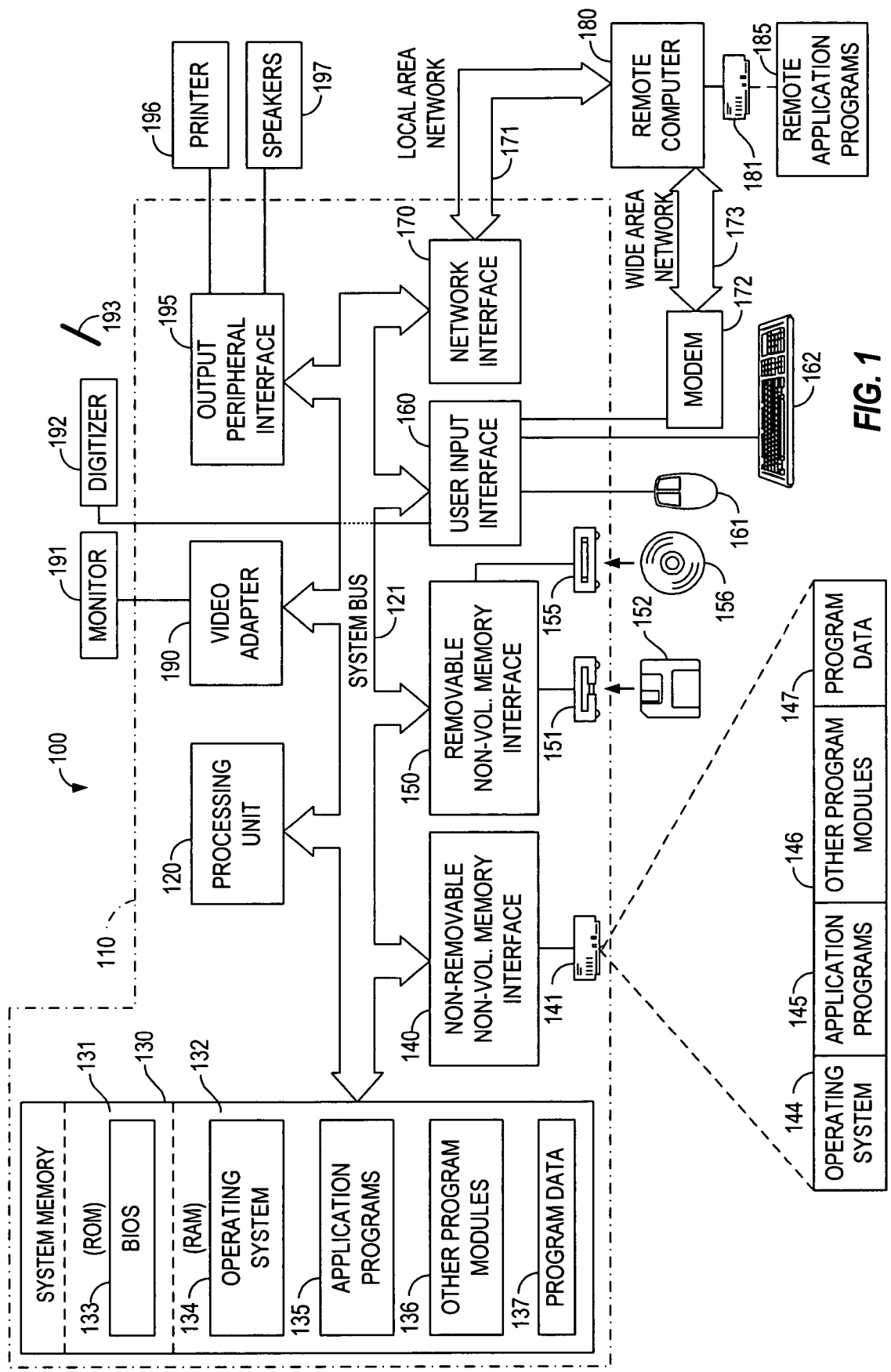
FIG. 1 illustrates a general purpose computing environment in accordance with an aspect of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Heuristics Methods

As noted above, numerous variations in hardware configurations are possible. For ease of discussion, the various hardware configurations discussed above will be referred to as a computer with the understanding that computers are not limited to the common desktop computer but rather encompass all types of related hardware disclosed above in any one of the numerous variations possible to one of ordinary skill in the art.

Figure 2:
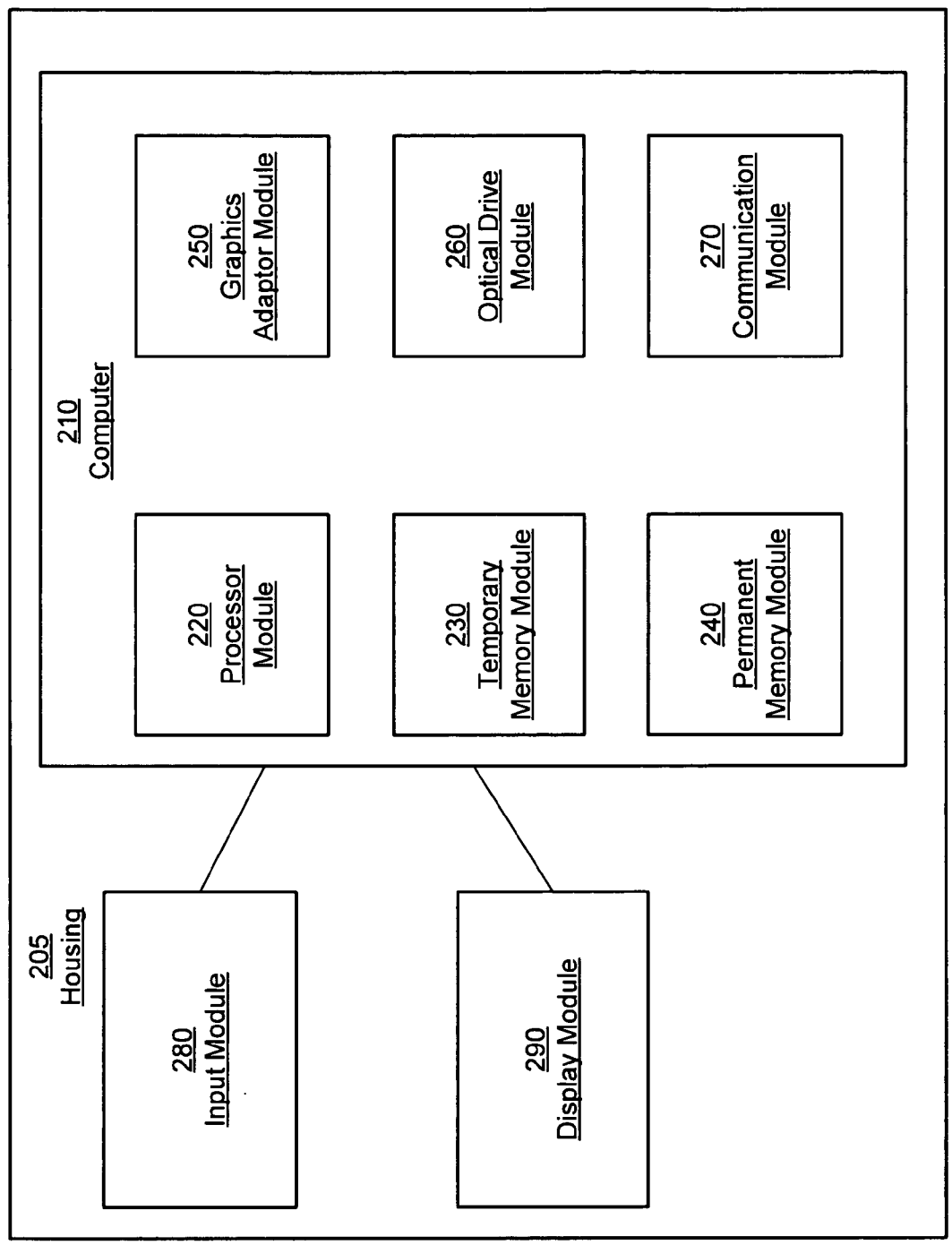
FIG. 2 illustrate a simplified schematic representation of a computer system in accordance with an aspect of the present invention.

Turning to FIG. 2, a simplified depiction of an exemplary computer 210 is illustrated. The computer 210 includes a processor module 220, a temporary memory module 230, a permanent memory module 240, a graphics adapter module 250, an optical drive module 260, and a communication module 270. Connected to the computer 210 are an input module 280 and a display module 290. In an embodiment, all the above modules may be provided in a single housing 205. In an alternative embodiment, one or more of the modules may be separate from the rest and thus in separate housings, not shown.

It should be noted that the term module refers to functional rather than physical structure. Thus, various physical components may be combined as desired and appropriate to form the various modules. If the module is a hardware component, the same hardware may be used to provide the functionality of one or more modules. For example, the display module and input module may be combined in the form of a touch sensitive display. Furthermore, one or more of the modules may be omitted or located remotely. For example, the computer 210 may have many modules located remotely but keep the graphics adapter module 250 and the communication module 270 located locally. It is noted that additional modules may be added as desired. It is further noted that a module, being functional, can also be a software module and such modules will be discussed below.

Thus, it is common for a user to provide input through the input module 280 and have the computer 210 generate output for viewing on the display 290 through interaction between the various modules. As can be appreciated, however, modules consume power when in use. Therefore, to reduce power consumption, modem computers include software that provides for power management. Typically, the power management involves changing the state (e.g. deactivating or suspending) of one or more modules or one or more of the components that make up the modules.

However, as a user may be attempting to use the computer 210, it is helpful to control the power management functionality. For example, existing power management allows an individual to specify the inactivity period before the state of the display module 290 is changed, the inactivity period being a period of time the computer should wait to receive user input before changing a state in response to the lack of user input. This simple functionality is effective in certain circumstances because in many situations the computer 210 regularly receives input from the user through the input module 280 and therefore the computer 210 is able to determine that the user is using the computer 210 on a continuous basis.

In other situations, however, the computer 210 is unable to determine that it is being used by the user. For example, if the user is viewing or considering a document with complex material or high levels of detail, the user may provide no input to the computer 210 for sufficient time as to exceed the pre-set inactivity period. In such a situation, the power management software may initiate a change in state that is contrary to the wishes of the user.

Figure 3:
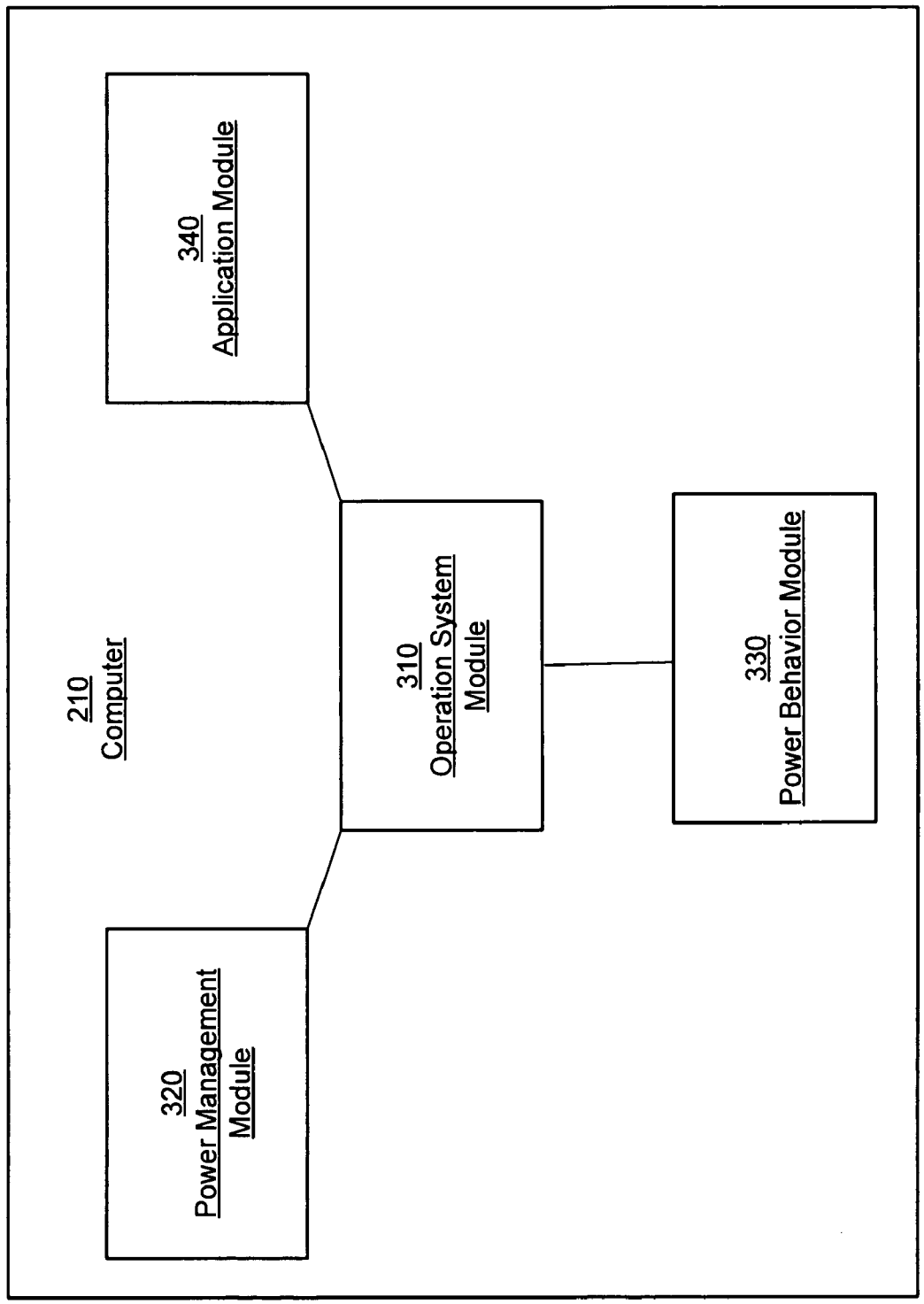
FIG. 3 illustrate a schematic representation of a set of software modules in accordance with an aspect of the present invention.

FIG. 3 illustrates a schematic representation of several software modules that interact together. As depicted, the computer 210 may include an operating system ("OS") module 310, a power management module 320, a power behavior module 330, and an application module 340, all the software modules running on the computer 210. It should be noted that one piece of software may provide the functionality of two or more different modules, thus, as noted above, the term module refers to a functional grouping.

Typically, the OS module 310 controls how the different hardware modules interact with the various software modules so that both hardware and software can work together in harmony. The power management module 320, one of the software modules interacting with the OS module 310, provides instructions to the OS module 310 to change the states of one or more of the hardware modules in response to period on inactivity by the user. For example, the power management module 320 may provide an instruction that causes the display module 290 (FIG. 2) to be blanked in response to an inactivity period. The power management module 320 may also provide instructions to deactivate or change the state of other physical components in response to different periods of inactivity.

While not required, in enterprise situations involving greater numbers of users it may be beneficial to provide additional functionality. For example, the power management module 320 may be controlled by group settings, some or all of which would not end-user adjustable. This would allow, for example but without limitation, the administrator to specify and fine tune the behavior of the power management module 320 and the power behavior module 330. This additional level of control may be provided by a separate manageability module (not shown) or may be incorporated into one of the depicted modules such as the power management module 320 or the operating system module 310. In an embodiment one or more of the group settings may reside in the registry for ease of access. It should be noted that this functionality could also be provided for general consumers but in practice would rarely be used.

Typically, the user will be interacting with the application module 340 in such a manner as to avoid exceeding an inactivity period as specified. For example, the user may be manipulating information being illustrated on the display module 290 with the input module 290. This manipulating typically requires the user to provide some sort of input such as, but not limited to, mouse clicks or mouse movement or keystrokes. Thus, the input module 290 may include computer mice, keyboards, optical drives, ports such as USB or FIREWIRE ports, infrared receivers, and any other component that allows the user to provide date input to the computer.

Sometimes, as noted above, the information provided on the display module 290 takes some time to read, consider and/or evaluate. For example, a spreadsheet program such as EXCEL may include a sheet with large number of entries. If the user needs to consider the importance of a number of the entries, a substantial amount of time may lapse before the user provides additional input. Therefore, although the user is using the computer to view the information being displayed, the computer does not observe any user input. In such a situation, after receiving no input through the input module 280 for an amount of time equal to the inactivity period, the power management module 320 provides instructions to the computer 210 to change the state of a hardware module (e.g. to blank the display module 290).

When this happens, if the change in state was undesired, the user will typically provide some sort of feedback such as movement of the mouse or a keystroke so as to indicate the information be illustrated on the display is being used. Then power management module 320 will then provide instructions to activate the display module 290 (or whatever module that has been subjected to a state change by the power management module 320). Thus, the user may provide feedback that the display is being used.

The time between when the hardware module changes states and the user provides feedback is the reaction delay. The power behavior module 330 may monitor the reaction delay. The power behavior module 330 may also include a predetermined response period. When the reaction delay is determined to be less than the response period, where the response period may be 5 seconds, 30 seconds, 1 minute, 2 minutes or some other period of time, the power behavior module 330 may initiate a behavior tracking mode. In an alternative embodiment, the behavior tracking mode might be automatically activated during initiation of the computing device.

In an embodiment, after the behavior tracking mode is initiated, the power behavior module 330 monitors subsequent reaction delays by the user in response to state changes after failing to receive user input for the inactivity period. This state change may be from an active state to a reduced power state such as is accomplished when blanking a display. When a reaction delay is less than a predetermined value, such as the response period, the power behavior module 330 may increase the inactivity period so as to increase subsequent inactivity periods. Thus, through user feedback an indication is provided that the inactivity period should be increased. In an embodiment, the power behavior module 330 may also decrease the inactivity period if the user fails to respond within a pre-determined time that may be equal to or larger than the response period. Thus, in an embodiment a short reaction delay could cause an increase in the inactivity period, an intermediate reaction delay could have no impact on the inactivity period, and a long reaction delay could shorten the inactivity period.

Figure 4:
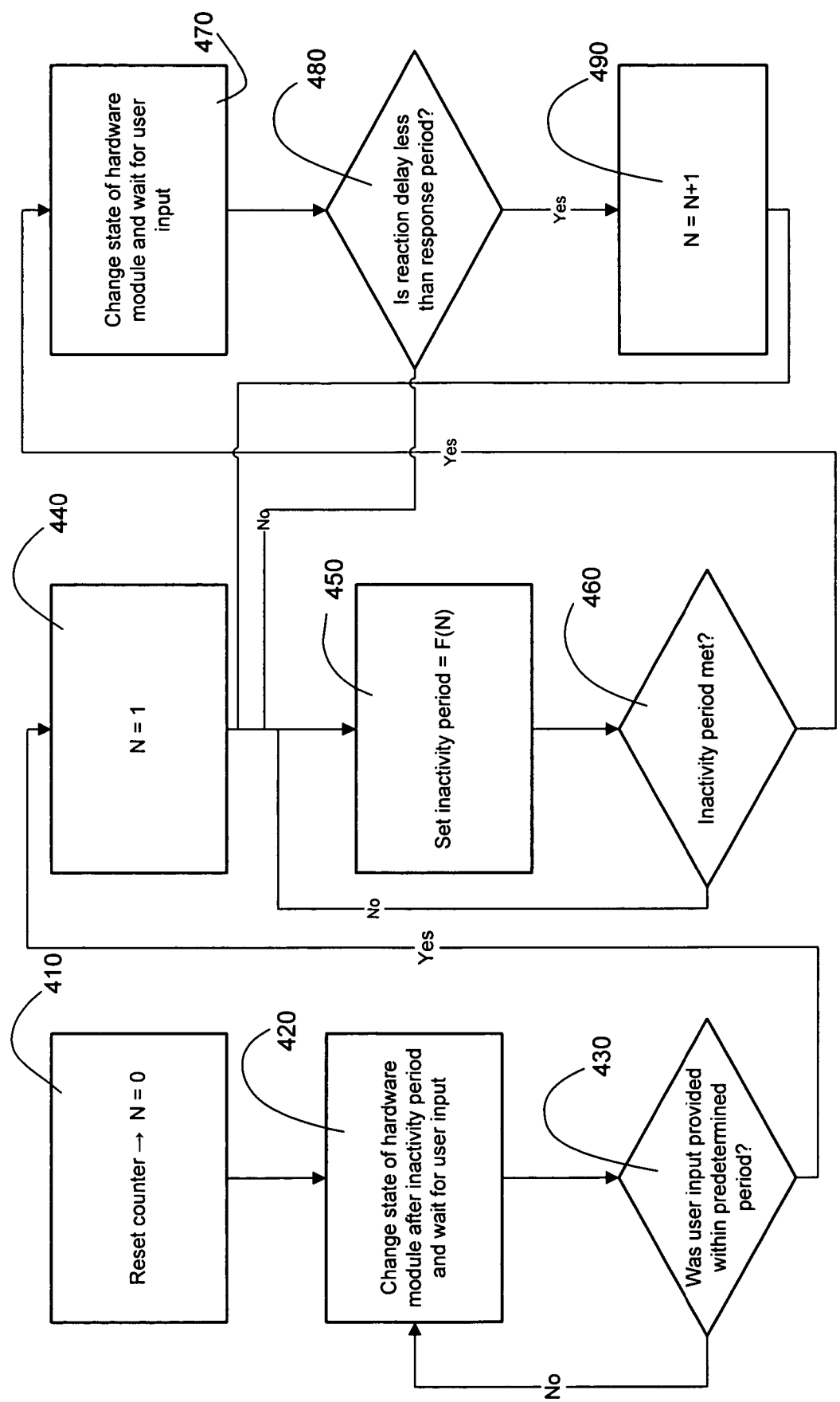
FIG. 4 illustrates an alternative method for controlling hardware state change in accordance with an aspect of the present invention.

FIG. 4 illustrates an embodiment of a method for adjusting the inactivity period in response to user feedback. In step 410, the counter value is reset to zero. This may be caused by a number of reset events, including but not limited to, the computer being restarted, the user logging off the computer, the user locking the screen, the user initiating a non-working sleep state or away mode, the use ignoring the change in state caused by the power management module 320 (FIG. 3), and the user session disconnecting. These reset events may also be used to deactivate the behavior tracking mode.

In step 420 the state of a hardware module is changed and the reaction delay is monitored. Once user input is received, the reaction delay is compared to the response period in step 430. If the reaction delay is greater than the response period the user is not indicating the inactivity period is too short and step 420 may be repeated.

If the reaction delay is less than the response period, in step 440 counter N is set equal to 1. Next in step 450, the inactivity period is set equal to period of time equal to the function F(N). F(N) may be a linear function such as inactivity period times N. In such a case, the resultant inactivity period will be equal to the prior inactivity period. A possible advantage to allowing the inactivity period to remain the same is that in instances where the user does not care about the hardware module changing states but accidentally provided the first input, the one-time provision of input with a short reaction delay will not effect the inactivity period and therefore the power consumption will be reduced as desired.

The function F(N) may also be logarithmic, exponential or some other non-linear function that provides a significant increase in the inactivity period in response to a first reaction delay being less than the response period. With a non-linear function it may be desirable for subsequent increases in the inactivity period to trend towards zero. A possible advantage of using such a non-linear function is that the user can obtain a more desirable response from the computer more quickly and therefore is less apt to feel the computer is interrupting.

In step 460 the computer again waits until the inactivity period is exceeded. The state of the hardware module is then changed in step 470 and the computer waits for user input. Once the user provides input, the reaction delay is compared to the response period in step 480. If the reaction delay is greater than the response period, step 450 is repeated. It should be noted that in an alternative embodiment, step 440 may follow a reaction delay being greater than the response period. In another alternative embodiment, if N is greater than 2 the value of N can be reduced by 1 and step 450 may be repeated.

If, however, the reaction delay is less than the response period in step 480, then in step 490 the value of N is incremented by 1. Next, the inactivity period is calculated again in step 450 and steps 460-480 are repeated as appropriate. While not depicted, when one of the conditions discussed above, such as the user logging off, occurs, the algorithm can go to step 410. Thus, a regular check to see if reset event has occurred will allow for resetting the counter N.

Figure 5:
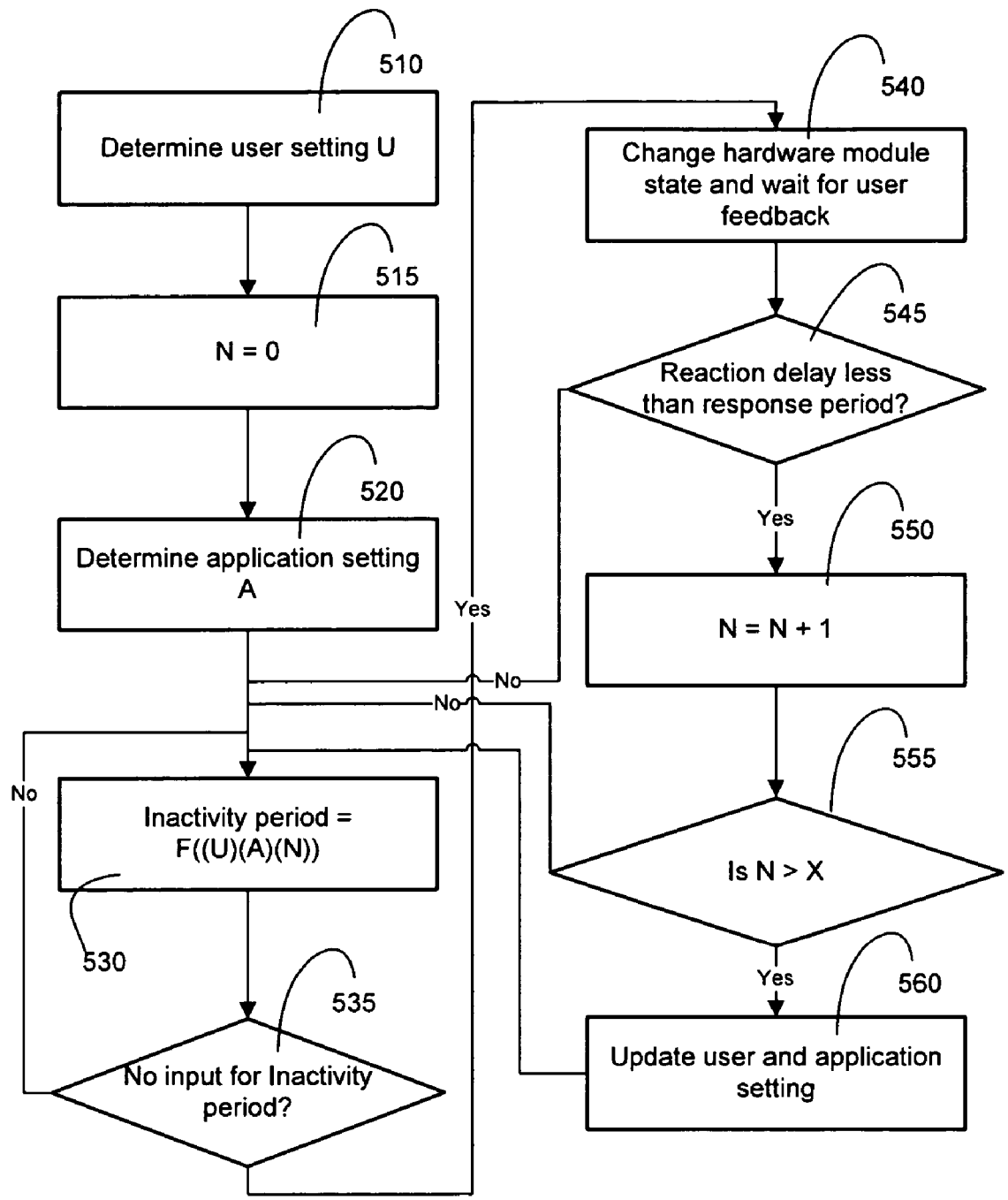
FIG. 5 illustrates an alternative method for controlling hardware state change in accordance with an aspect of the present invention.

Turning to FIG. 5, an alternative embodiment of a method for adjusting the inactivity period in response to user feedback is depicted. First in optional step 510, a power management module checks which user is logged in to determine the value U. In step 515, the counter N is set equal to zero. As discussed above, N may be reset each time a user logs in or some other reset event such as discussed above occurs. It is noted that step 510 could occur during boot-up of the machine but may also occur in response to a reaction delay following a state change where the reaction delay is less than the response period.

Next in optional step 520, the application or applications being run can be used to determine the value of A. As can be appreciated, with modern OS software more than one software application can be run at the same time but typically the user can only use one application at a time. Therefore, in an embodiment, the last application being used can control the value of A. In an alternative embodiment, all the applications running will affect the value of A. Regardless of the method, if step 520 is included, the application(s) being run may change depending what the user is doing. Thus, for a given user it is expected, but not required, that the value of A will change depending on what applications are being run.

Next in step 530 the inactivity period is determined by the function F((U)(A)(N)). In an embodiment, U and A may be ignored. In an alternative embodiment only U or A may be used in conjunction with N. The advantage of ignoring U and A is that all users are treated equally and the power management settings may be applied on a system wide basis. This can help reduce power consumption.

In an embodiment the user value U may be used to determine the inactivity setting. In an embodiment, U may change depending on the class of user. In an alternative embodiment, U may be some value based on past user preferences and/or usage patterns. For example, if a particular user always causes the inactivity period to increase to a maximum value then there is less reason to force the user to start at the shortest inactivity setting and steadily expand the inactivity period through user feedback every time the user logs on. Therefore, use of the value of U allows the power management module to take into account past usage patterns when determining how to respond to a particular user. As can be appreciated, U can be determined through statistical analysis of user usage pattern or more simply through incremental increases being applied to the value of U when the user maximizes or increases the inactivity period. An advantage of including U is that a more tailored fit can be provided for each user while still applying an aggressive power management setting system wide. If statistical analysis is used and the user cannot simply increase the inactivity period manually, the inactivity period may be set at a level that takes into account the cost of energy consumption versus cost of interrupting the user's work without the user directly making any changes to the inactivity setting. It should be noted that if the value of U is used to determine the inactivity period, the value of U may be sufficient to maximize the inactivity period immediately or may simply increase the inactivity period to a larger starting value.

In an embodiment the application value A may be used to determine the inactivity period. As can be appreciated, some applications may include a presentation mode. This allows the application to instruction the power management module to not change the states of hardware modules. However, many applications do not have a presentation mode and/or are not always used in the presentation mode but the user would like to use the application in such a fashion. Therefore, the power management module may determine that when a particular application is being used the inactivity period should be increased or maximized. In response, different applications can be assigned different values $a_1$-$a_n$ and, depending on what application(s) is/are running or was used last, the application value A may change. As with the user value, the application value $a_x$ may be assigned, may be determined through incremental usage patterns or may be determined through a more complex statistical analysis.

In step 530, the inactivity period is determined based on the value of N, A and U. If A and U are not used then the inactivity period will be determined by N alone. In an alternative embodiment, the certain users may have a U value while other users do not. This will allow the system to be configured so that certain individuals are given a longer starting inactivity period. Similarly, certain applications may include an $a_x$ value so as to affect the A value while other applications may be configured to not have an impact on the inactivity period. Thus, applications like OUTLOOK that are typically left on throughout the day regardless of usage will not affect the inactivity period.

Next in step 535, a lack of input for the inactivity period is monitored. Once this happens, in step 540 the state of one or more hardware modules is changed and the time until the user provides an input is determined so as to calculate the reaction delay. In step 545 the reaction delay is compared to the response period, which may be predetermined and may be determined based on a statistical analysis of usage patterns. For example, if the mean time from state change to user input is 30 seconds with a standard deviation of 15 seconds, a response period of 60 seconds can allow a statistically significant portion of the user inputs to have an impact on the inactivity period. The response period may be therefore be determined based on an individual's usage patterns or a set of users and may be calculated periodically or in advance.

If the reaction delay is greater than the response period, step 530 is repeated. In an alternative embodiment, step 535 may repeated instead of 530.

If the reaction delay is less than the response period, this indicates that the user did not want the hardware module to undergo the state change. In response, in step 550 the value of N is incremented.

Next in optional steps 555 and 560, the user and application settings are updated if the value of N is sufficient to indicate the fact that the user has responded with the reaction period more than a particular number of times.

If steps 550 and 560 are not used or if the value of N is not greater than X, where X is a value that may be predetermined or may be statistically determined, then in step 530 the inactivity period is recalculated. Thus, in an alternative embodiment some of the above steps may be combined or omitted.

Figure 6:
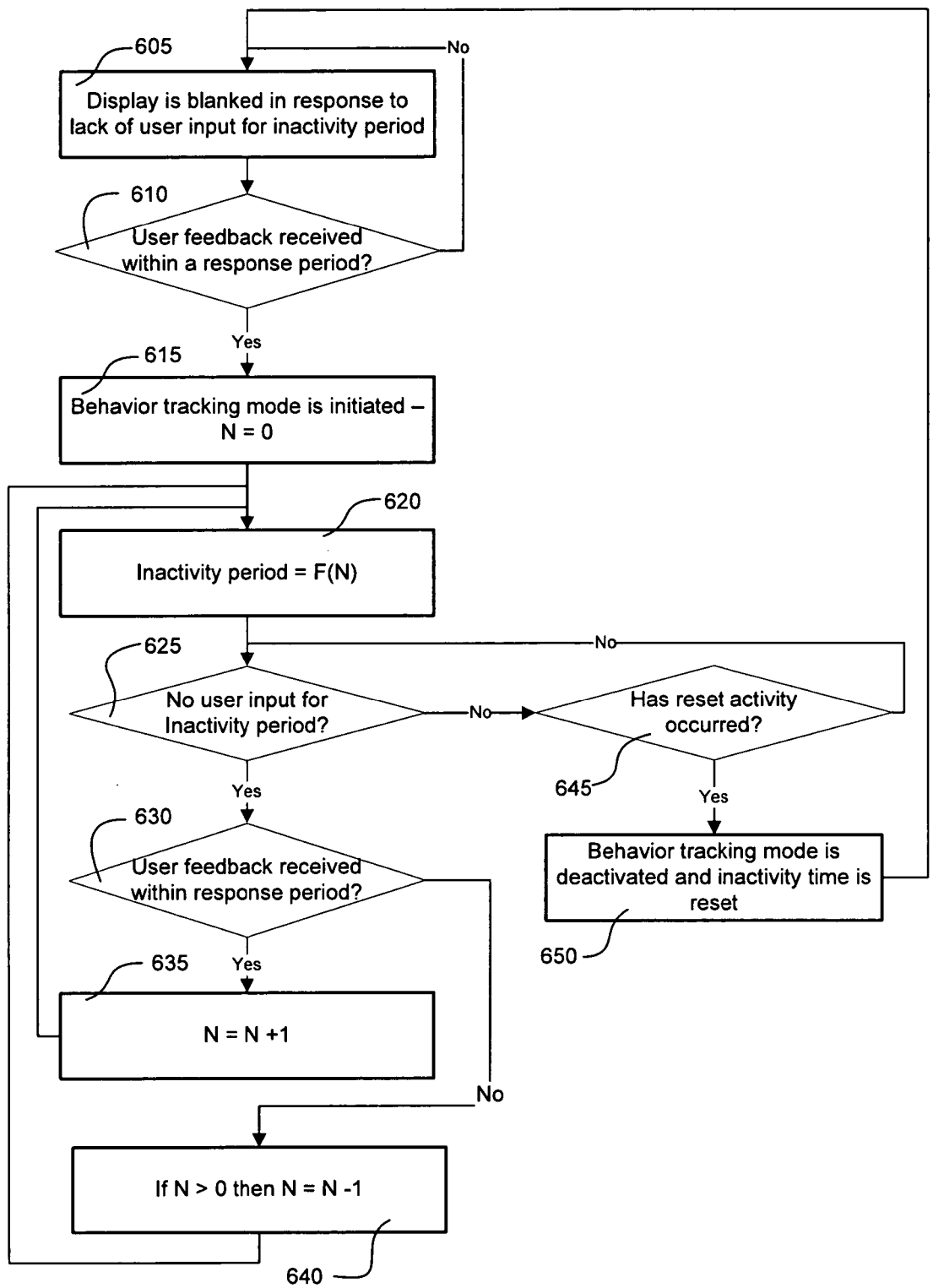
FIG. 6 illustrates an alternative method for controlling display blanking in accordance with an aspect of the present invention.

As can be appreciated, alternative methods of controlling the power management features are possible. For example, FIG. 6 illustrates another alternative method for adjusting the inactivity period in response to user feedback.

First in step 605, the display is blanked in response to a lack of user input for a predetermined activity period. It should be noted that in an alternative embodiment a module state may be changed. In an embodiment the inactivity period may be 3 minutes. This blanking may be caused by the power management module 320 discussed above in FIG. 3 or the power management modules 320 and the power behavior module 330 may be combined. It should be noted that, as discussed above, as modules refer to functionality, the various modules discussed above may be combined, may be incorporated into the OS 310 or some application, may be provided as firmware or even provided as hardware in the form of a dedicated integrated circuit. For maximum flexibility, however, the various power management modules may be provided as separate software.

Eventually the user will notice the display is blanked and may move the mouse and or press a key or provide some other sort of user input to activate the display. In step 610 the reaction delay is compared to a response period. If the reaction delay is more than the response period, then step 605 is repeated. If the reaction delay is less than the response period, then in step 615 a behavior tracking mode is initiated. As part of the initiation of the behavior tracking mode the counter N may be set equal to 0.

Next in step 620 an inactivity period is set equal to F(N). In an embodiment, F(N) is:

$$F(N)=(3\ min)+(3\ min)(N)$$

In such an embodiment, when N is equal to zero, the value of inactivity period is still three minutes.

Thus, in the embodiment depicted above, for N equal to zero, the inactivity period does not change from the previous inactivity period. Thus, as depicted, the initiation of the behavior tracking mode has no noticeable effect on the inactivity period.

Next in step 625 a check is made to see if there has been a lack of user input for a time exceeding the inactivity period. If the answer is no, then step 645 is taken next.

However, if the is no user input for the inactivity period, in step 630 a check is made to see if user feedback occurs within the response period. In other words, a check is made to see if the reaction delay is less than the response period. It should be noted that the response period may be retrieved from a registry-based group policy setting so as to make it easier to determine appropriate inactivity period. In an embodiment, the response may be obtained from the manageability module (not shown) that may contain various settings such as group policy.

If the reaction delay is less than the response period then the value of N is increase by 1 in step 635. If the reaction delay is more than the response period then, if the value of N is greater than zero, N is decreased by 1 in step 640. After either step 635 or step 640 is complete, the inactivity period is recalculated in step 620 and step 625 is repeated.

As can be appreciated, typically the user will provide some user input because the user is interacting with the computer. If, there was user input during the inactivity period, then in step 645 a check is made to see if any activity has taken place that should initiate a reset or deactivation of the behavior tracking mode. If a resetting activity such as discussed above has occurred, then in step 650 the inactivity period is reset and the behavior tracking mode deactivated. If no resetting inactivity has occurred, then step 625 is repeated.

As can be appreciated, determining if there is no activity for the inactivity period requires waiting the entire period. Once some activity has occurred, however, it can be immediately determined that there was user input during the inactivity period and the display will not blank and the inactivity period is restarted. To avoid continuous cycling through step 645, the check in step 625 can be made after a period of delay equal to a portion of the current inactivity period (such as one half of the inactivity period). As can be appreciated, the time of the last user input may be stored in a circular buffer. If there was no activity then step 625 may be repeated at the time the activity period ends or at some other interval. If there was some activity then the time the inactivity period will end is adjusted to take into account the last user input.

As can be appreciated, however, it is possible to provide numerous variations on the above methods for controlling the inactivity period. For example, different steps from each of the methods may be combined so as to form a variation of the methods discussed above.

In an embodiment, the power behavior module 330 (FIG. 3) is dependent on enabled/disabled events from a screen saver and monitor power settings in the power management module 320. It can also captures messages for when the machine enters a sleep state to reset the counter. The power behavior module 330 can ensure that once enabled, the inactivity period is at least as long as the usual inactivity period using a function as discussed above.

In an embodiment, power behavior module 330 uses the concept of an adjustable suspend period, implemented by calling a Windows SetThreadExecutionState( ) API with ES_DISPLAY_REQUIRED. Thus, the inactivity period comprises a static inactivity period and the adjustable suspend period. In an embodiment, the power behavior module 330 does not vary the static inactivity period, which may be provided by a separate module such as the manageability module discussed above, but instead suspends the start of the static inactivity period by controlling the adjustable suspend period. In an embodiment, the static inactivity period of the power management module 320 has a group policy setting associated with it, residing with the remainder of group policy settings for power management. It should be noted that the group policy setting may set the static inactivity period and may also disable the behavior tracking mode. In an embodiment, a manageability module controlling various settings such a group policy may disable the power management module, either directly or by setting a value such that the power behavior module 330 is never activated. Furthermore, if more than one group is provided for, different groups may have different settings.

Figure 7:
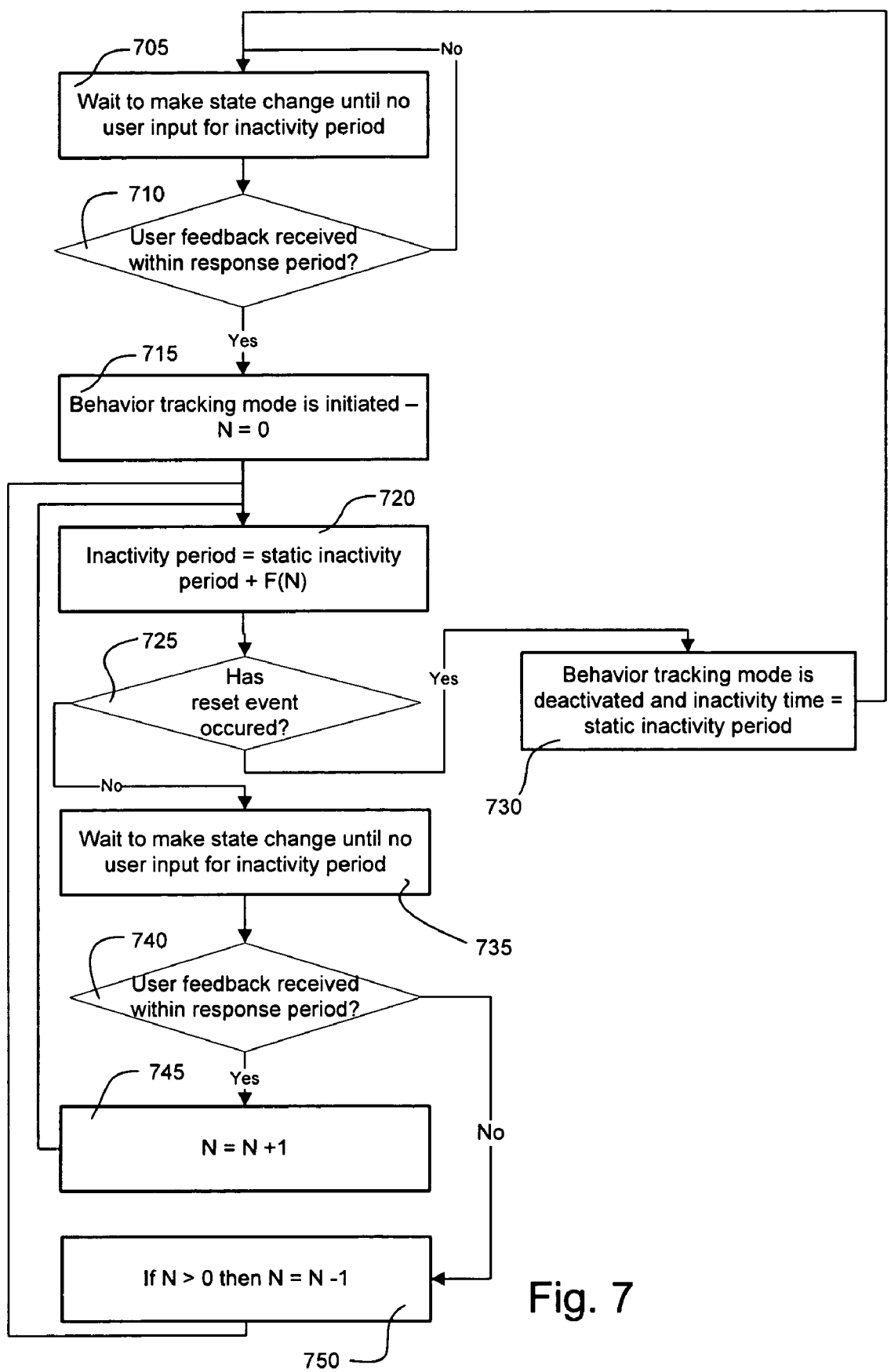
FIG. 7 illustrates an alternative method for controlling display blanking in accordance with an aspect of the present invention.

FIG. 7 illustrates the use of an adjustable suspending period in combination with a fixed inactivity period. In step 705 a state change occurs in response to a lack of user input for the inactivity period. In step 710, a power management module determines whether the reaction delay exceeds the response period. If it does, then step 705 is repeated. If the reaction delay is less than the response period then in step 715 the behavior tracking mode is initiated and N is set equal to zero.

Next in step 720, the inactivity period is set equal to the static inactivity period plus the suspend value S(N). In an embodiment, S(N) may equal to a period of time multiplied by the value of N. In step 725, a check is made to see if a reset activity has occurred. If a reset event has occurred then in step 730 the behavior tracking mode is deactivated and the inactivity time is set equal to the static inactivity time.

If a reset event has not occurred, in step 735 a lack of user input for the inactivity period is waited for. When there has been no user input for the inactivity period, the reaction delay is compared to the response period in step 740. If the reaction delay is less than the response period then in step 745 the value of N is increased and step 720 is repeated. If the reaction delay is greater than the response period, then in optional step 750 the value of N is decreased and then step 720 is repeated. In an alternative embodiment, the value of N may be left the same if the reaction delay is greater than the response period.

It should be noted that while several embodiments depict a series of steps to gradually increase the inactivity delay, in an alternative embodiment the inactivity delay may be increased in a single step. This does not allow for as tailored a response as a series of steps and therefore may not maximize energy efficiency but may provide a satisfactory response to the user if the increase in the inactivity delay is sufficient. In addition, as discussed with regard to FIG. 6, in the inactivity delay may also be reduced in a series of steps or in a single step.

Figure 8A:
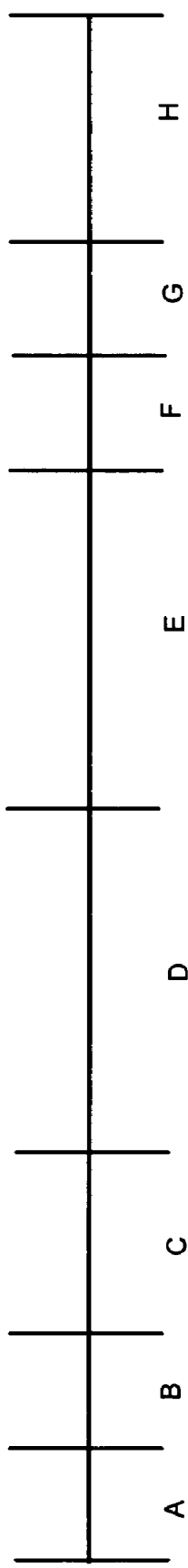
FIG. 8a illustrates an embodiment of changing inactivity periods in response to user feedback in accordance with an aspect of the present invention.
Figure 8B:
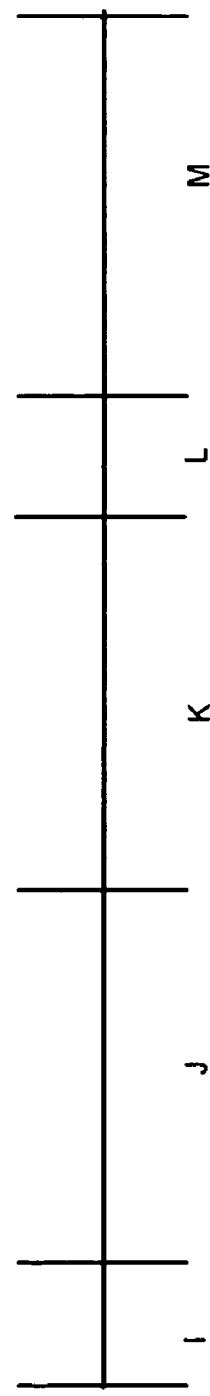
FIG. 8b illustrates an alternative embodiment of changing inactivity periods in response to user feedback in accordance with an aspect of the present invention.

To provide additional clarification, FIG. 8a illustrates the effect of methods for implementing power management. As can be appreciated, FIG. 8a illustrates the more tailored response of increasing the inactivity delay through a series of steps. If a single step were to be used, the illustration as depicted in FIG. 8b is more representative of what the user would perceive.

As depicted in FIG. 8a, inactivity periods A through H are illustrated. Period A represents the standard inactivity period, which may be set by the user or the system administrator and may be the static inactivity period. Thus, after receiving no user input for period A, a state could be changed (e.g. a display could be blanked). If the reaction delay was less than a response period, a power management module or mode may be activated. As can be appreciated, period B is the same as period A. This allows the power management to remain aggressive in changing the state of hardware modules in the event that the initial activation of the power management module or mode was accidental.

In the event that the user desires a longer inactivity period because the computer is being used in a passive manner, the user will quickly provide user input in response to a hardware module state change after period B. Thus, the reaction delay will be less than the response period. Periods C and D reflect an increasing inactivity period in response to user feedback. However, as noted above, the inactivity period perceived by the user may be the result of an adjustable suspend period based on user feedback and a static inactivity period.

Period E, however, is not larger than D because it has reached a maximum. While the inactivity period does not need to be limited to a maximum value, in an embodiment the computer may have a tier response to inactivity. For example, the computer may first blank the display. In response to further inactivity, the computer may enter a suspended state or even enter a shutdown or off state. In such an embodiment, it may be advantageous to prevent the inactivity period for the initial state change from equaling the inactivity period for the suspended or shutdown state. For example, in an embodiment the suspended state change may occur in response to no input being provided for 15 minutes. To ensure the user has some warning that the computer is about to enter the suspended state, it is desirable to have another state change such as blanking the display first. Thus, in an embodiment where a suspended state occurs after 15 minutes, the inactivity period for display blanking may be capped at 12 minutes. As can be appreciated, if there is no suspend state change inactivity period then there is less reason to cap the inactivity period. Furthermore, more than one inactivity period can be monitored. Thus, the power management module may keep track of a plurality of inactivity periods to see if the associated response should be initiated. In addition, different power management modules may keep track of different inactivity periods for different reasons.

Inactivity period F represents a resetting of the inactivity period. Inactivity periods G and H represent the user again signifying that the standard inactivity is too short.

As discussed above, to aid in making the computer feel as user friendly as possible, it may be desirable to vary the inactivity period based on the user and/or the application being used. Thus, while the same basic pattern might be experiences by all users, for some users the inactivity period A may be longer than for others.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method of adjusting power management of a module in a computing device; comprising:
    (a) changing the module from an active state to a reduced power state after an inactivity period;
    (b) receiving an indication that the inactivity period is too short and changing the module back to the active state; and
    (c) when the indication in (b) is received, increasing the inactivity period, the increasing comprising computing an increased inactivity period by adding an increase amount to the inactivity period, the increase amount being selected in accordance with a non-linear function of a number of times since a reset event that an indication that the inactivity period is too short has been received; and
    (d) changing the module from the active state to the reduced power state after the inactivity period computed in (c).

2. The method of claim 1, further comprising:
    (e) initiating the tracking of the indication received in response to the change in the state of the module, the initiating being caused by an initial indication that the inactivity period is too short.

3. The method of claim 1, wherein the receiving the indication in (b) comprises:
    (i) observing a reaction delay between the change in state of the module and a user input; and
    (ii) determining that the reaction delay is less than a response period.

4. The method of claim 1, comprising repeating (b)-(d).

5. The method of claim 1, wherein the module is a display and the reduced power state is a blanking of the display.

6. The method of claim 1, wherein (c) comprises:
    (i) incrementing a counter in response to receiving the indication that the inactivity period is too short; and
    (ii) adjusting the inactivity period by an amount that is a function of a value in the counter.

7. The method of claim 1, wherein the inactivity period of (a) comprises a static inactivity period and an adjustable suspend period and the increasing the activity period in (c) comprises:
    (i) increasing the adjustable suspend period in response to receiving the indication that the inactivity period is too short.

8. A computer-readable storage medium containing computer-executable instructions for causing a computer to perform the steps of:
    (a) checking a value of a counter variable;
    (b) if the value of the counter is not zero, adjusting an inactivity period for changing a module from an active state to a reduced power state based on the value of the counter, the adjusting comprising computing a value of the inactivity period based at least in part on an application active at the start of the inactivity period;
    (c) monitoring a reaction delay between a change in the state and a user input; and
    (d) if the reaction delay is less than a response period, incrementing the value of the counter.

9. The computer-readable storage medium of claim 8, wherein the module is a display.

10. The computer-readable storage medium of claim 8, wherein (b) comprises:
    (i) if the value of the counter variable is 1, setting the inactivity period equal to an initial inactivity period; and
    (ii) if the counter variable is greater than 1, adjusting the inactivity period to be greater than the initial inactivity period.

11. The computer-readable storage medium of claim 10, wherein the adjusting the inactivity period in (ii) comprises:
    (1) adjusting the inactivity period based on the value of the counter variable according to an predetermined algorithm that further comprises computing the value of the inactivity period based at least on part on a setting associated with a user interacting with the computer at the start of the inactivity period.

12. The computer-readable storage medium of 8, further comprising:
    (e) delaying a securing of the state change with a password for the response period, whereby the user is free to reverse the hardware state change without entering a password during the response period.

13. A method of adjusting power management features in a computing device; comprising:
    (a) checking a value of a power management variable;

(b) adjusting a suspend period in response to the power management variable, the suspend period determining the amount of delay before an static inactivity period starts, the combination of the suspend period and the static inactivity period determining a time to a state change;
(c) monitoring a reaction delay after the state change; and
(d) adjusting the value of the power management variable in response to the reaction delay, wherein the power management variable comprises a first variable and a second variable, the first variable being a counter and (d) comprises:
(i) incrementing the value of the first variable when the reaction delay is less than a response period.

14. The method of claim 13, further comprising repeating (a)-(b).

15. The method of claim 13, wherein the second variable corresponds to a user preference stored in a memory module.

16. The method of claim 15, wherein the user preference corresponds to a pattern of usage by the user.

17. The method of claim 13, wherein the second variable corresponds to an application preference.

18. The method of claim 13, further comprising:
(e) setting the value of the power management variable to a starting value in response to a reset event, the starting value depending of the value of the first variable and the value of the second variable.

19. The method of claim 18, further comprising:
(f) adjusting the value of the second variable in response to the adjusting the value of the first variable; and
(g) storing the adjusted value of the second variable in the memory module, whereby the starting value of the power management variable is adjusted in response to the adjusted value of the second variable.

* * * * *